H. MILLER.
NECKTIE IRONER.
APPLICATION FILED NOV. 8, 1918.

1,329,919. Patented Feb. 3, 1920.

INVENTOR
Harald Miller
BY
Strong & Townsend
ATTORNEYS

UNITED STATES PATENT OFFICE.

HARALD MILLER, OF SAN FRANCISCO, CALIFORNIA.

NECKTIE-IRONER.

1,329,919.   Specification of Letters Patent.   Patented Feb. 3, 1920.

Application filed November 8, 1918. Serial No. 261,624.

*To all whom it may concern:*

Be it known that I, HARALD MILLER, a citizen of the United States, residing at San Francisco, in the county of San Francisco and State of California, have invented new and useful Improvements in Necktie-Ironers, of which the following is a specification.

This invention relates to a necktie ironer. It is the principal object of this invention to provide a portable device of convenient dimensions by which neckties may be ironed. Due to the fact that ties, such as four-in-hand ties, become easily wrinkled, it is desirable to restore them to their original smooth condition. This operation has proved difficult as when the tie is ironed, wrinkles will usually be pressed along the side folds of the tie and cannot be readily stretched out. An object of this invention is to provide a device which will stretch the tie to its original shape and will permit the wrinkles along its folded edges to be smoothed out prior to the ironing operation.

The present invention contemplates the use of a tubular form, adapted to be readily inserted within the end of the tie and to conform to its folded shape in a manner to stretch the body of the tie thereover and hold it in its stretched position. The tubular container is filled with hot water or otherwise provided with a heating element which will act to dry the tie out after it has been slightly moistened, thus eliminating the use of an iron and insuring that the surface of the tie will not appear excessively glossy.

The invention is illustrated by way of example in the accompanying drawings, in which—

Figure 1:
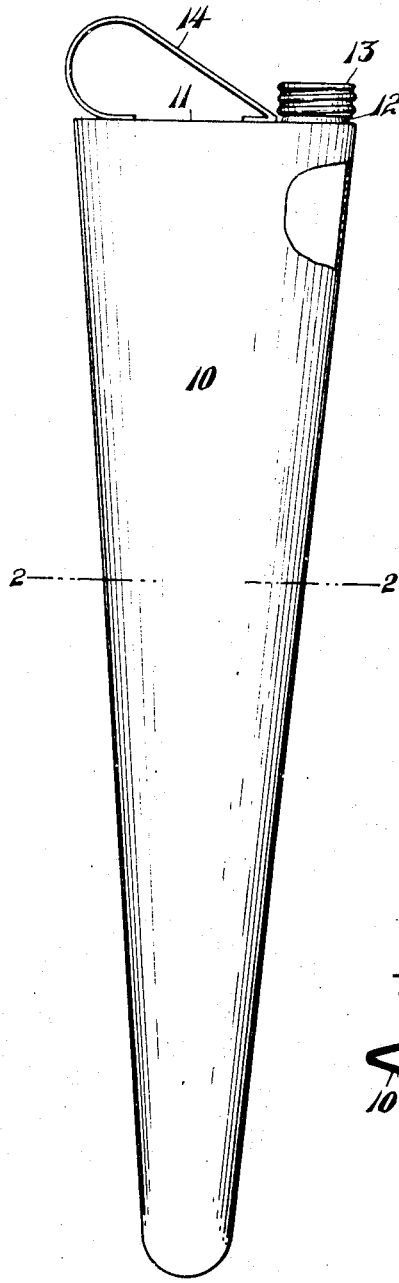
Figure 1 is a view in side elevation, disclosing one form of the device adapted to receive a quantity of hot water for the heating thereof.
Figure 2:
Fig. 2 is a view in transverse section, as seen on the line 2—2, Fig. 1.

Referring to the drawings, 10 indicates a container which is substantially ovoidal in transverse section throughout its length, as shown in Fig. 2. The side walls of this container taper gradually from the large end thereof to a closed pointed end, as shown in Fig. 1, the taper of the side walls corresponding in angularity to the folds of a four-in-hand tie. The enlarged end of the container thus formed is closed by a wall 11 provided in Fig. 1, with a tubular mouthpiece 12 which may be closed by means of a screw cap 13. Thus, the container will be provided with means through which hot water or other heated liquid may be placed therein and sealed. A suitable handle 14 is provided for convenience in carrying the container and holding it while it is being filled with the heated liquid.

Figure 3:
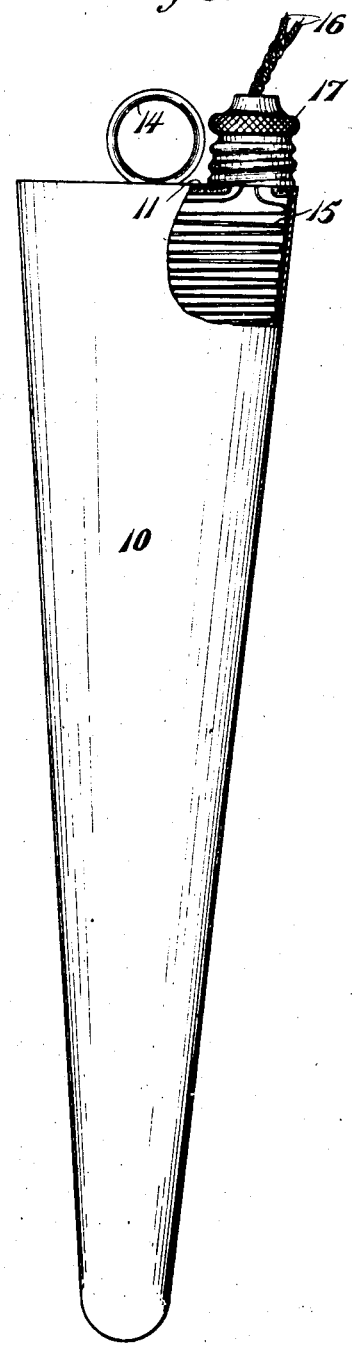
Fig. 3 is a view in side elevation, illustrating another form of the invention with parts broken away to disclose an electric heating element embodied therein.

In the form of the device shown in Fig. 3, an electric heating element 15 is incorporated within the container and is connected with electric conductors 16 which pass through a screw contact plug 17 detachably secured to the device. In this instance the use of the heated liquid will be dispensed with and the heating element utilized in warming the walls of the container. In operation, the container is placed within the end of the tie to be pressed, after which the tie is drawn snugly thereover and all of the wrinkles stretched out. It will be understood that if the form of the device shown in Fig. 1 is used, it will have previously been filled with hot water and if the device shown in Fig. 3 is employed, suitable connection will be made between the electric cord 16 and a source of electric supply. When the tie is placed in position, it may be slightly dampened and after having been left upon the form for a short period of time, will be dried out and will be restored to its original condition.

While I have shown the preferred form of my invention, it will be understood that various changes in the combination, construction and arrangement of parts may be made by those skilled in the art, without departing from the spirit of the invention as claimed.

Having thus described my invention, what I claim and desire to secure by Letters Patent is—

A portable necktie ironer for domestic use comprising a tubular container having uniformly tapering side walls to correspond to the formation of a necktie to be stretched thereover, said container having closed ends and the larger end flattened, a threaded mouthpiece projecting from said flattened end and alining with an aperture formed in the same to form an inlet to receive a heating medium whereby the necktie is dried when in position, and a handle on said flattened end of the container.

In testimony whereof I have hereunto set my hand in the presence of two subscribing witnesses.

HARALD MILLER.

Witnesses:
HENRY STOLTENBERG,
HARRY STOLTENBERG.